United States Patent Office 3,796,773
Patented Mar. 12, 1974

3,796,773
GRAFT POLYMERS
Lester Earl Coleman, Willoughby Hills, Ohio, assignor to The Lubrizol Corporation, Wickliffe, Ohio
No Drawing. Continuation-in-part of application Ser. No. 56,699, July 20, 1970. This application Mar. 19, 1971, Ser. No. 126,322
Int. Cl. C08f 5/12, 15/02, 15/10
U.S. Cl. 260—879
8 Claims

ABSTRACT OF THE DISCLOSURE

Macromolecular compositions which are synthetic polymers onto which have been grafted moieties derived from certain N-substituted acrylamides such as diacetone acrylamide.

---

This is a continuation-in-part of copending application Ser. No. 56,699 filed July 20, 1970.

The present invention relates to new polymeric compositions of matter. More specifically, the invention relates to macromolecular compositions of matter formed by grafting units derived from certain N-substituted acrylamides onto preformed polymers.

The ever-expanding diverse utilization of polymers demands the capability of modifying or tailoring polymers to meet the requirements of specific applications. By grafting the N-substituted acrylamides of this invention onto base polymers, macromolecular compositions are produced which retain properties of the unmodified base polymer but have additional desirable properties imparted to them by the grafted N-substituted acrylamides. For example, the particular N-substituted acrylamide monomers used in the grafting process to form the macromolecular compositions of this invention are very polar, many of them being water-soluble. Thus, base polymers used as adhesives have their adhesive characteristics enhanced when these N-substituted acrylamides are grafted thereto. Likewise, those polymers which are used in the formation of various solid components, e.g., panels and decorative fixtures which are to be joined to other objects by the application of adhesives will be capable of forming strong adhesive bonds at the interface when the base polymer has units derived from the N-substituted acrylamides grafted thereon. The grafting of the N-substituted acrylamides onto polymers used as fibers imparts improved dye-ability to the fibers by providing dye-reactive sites on the polymers. Likewise, the strength of the fibers is improved by the grafts. Other desirable characteristics are imparted to the base polymers by grafting thereon the N-substituted acrylamides as will be apparent to those skilled in the art from the following detailed description of the invention.

In accordance with the foregoing, it is a principal object of this invention to provide novel macromolecular compositions of matter. A further major object of this invention is to provide novel macromolecular compositions of matter comprising base polymers having grafted thereon one or more units derived from specified N-substituted acrylamides. Another object is to provide macromolecular compositions of matter characterized by beneficial chemical and physical properties. Another object is to provide macromolecular compositions of matter useful in the same applications as the base polymers from which they are derived, yet having unique, beneficial physical and chemical properties not possessed by the base polymers. Other objects of this invention are apparent from the detailed description of the invention contained herein.

These and other objects of this invention are achieved by providing a macromolecular composition of matter characterized by the presence within its structure of a base polymer moiety derived from a synthetic base polymer, said base polymer moiety having pendant therefrom at least one grafted moiety in which the grafted moiety comprises at least one unit derived from a polymerizable monomer of the formula $$R_1-Z-\underset{\underset{R_3}{|}}{\overset{\overset{R_2}{|}}{C}}-\underset{\underset{R_5}{|}}{\overset{\overset{R_4}{|}}{C}}-\underset{\underset{H}{|}}{N}-\overset{\overset{O}{\|}}{C}-\underset{\underset{R_6}{|}}{C}=CH_2 \quad \text{(Formula I)}$$

wherein $R_1$, $R_2$, $R_3$, $R_4$, and $R_5$ are each independently selected from the group consisting of hydrogen, aliphatic hydrocarbon radicals, and substituted aliphatic hydrocarbon radicals; $R_6$ is selected from the group consisting of hydrogen, halo, and lower alkyl radicals; and Z is selected from the group consisting of $$-\overset{\overset{O}{\|}}{C}- \quad \text{and} \quad -\overset{\overset{OH}{|}}{C}H-$$

Prior to describing the invention in more detail, it will be helpful to define certain terminology as used herein. First, the macromolecular compositions of matter of this invention are graft polymers. As used herein, the term "graft polymer" or "graft copolymer" describes those macromolecules having a backbone of one polymeric species wherein the backbone has pendant therefrom one or more side chains (or grafts) derived from the specified N-substituted acrylamides. The side chain may be a single unit derived from the N-substituted acrylamides but in most instances will be itself polymeric so as to contain a plurality of units derived from the N-substituted acrylamides. The backbone may be derived from a homopolymer or a copolymer including terpolymers and the like. Likewise, the side chain or grafts may be a single unit, as mentioned above, a homopolymer of the N-substituted acrylamides, a copolymer of two or more of the N-substituted acrylamides, or a copolymer of one or more of the N-substituted acrylamides with one or more other comonomers polymerizable with said N-substituted acrylamides provide that at least fifty percent of the repeating units in the copolymer are derived from the N-substituted acrylamides. Preferably however, the side chain will consist of one or more units derived from the same or different N-substituted acrylamides.

The terminology "base polymer moiety" is intended to describe that portion of the macromolecular compositions of this invention contributed by the base polymer onto which the N-substituted acrylamide unit or units is grafted. In other words, it is the backbone. The "grafted moiety" describes that portion of the macromolecular compositions which are the side chains or grafts contributed by the N-substituted acrylamides.

The N-substituted acrylamide monomers necessary for preparing the macromolecular compositions of this invention correspond to the Formula I wherein each of $R_1-R_6$ are as defined above. These monomers and processes for their preparation are described in detail in U.S. Pat. 3,277,056; and commonly assigned copending applications Ser. No. 788,820 filed Jan. 3, 1969, now U.S. Pat. 3,585,-125, Ser. No. 833,162 filed June 13, 1969, now abandoned; Ser. No. 111,676 filed Feb. 1, 1971; and Ser. No. 97,055 filed Dec. 10, 1970. For brevity, these patents and applications are expressly incorporated herein by reference.

The language "aliphatic hydrocarbon radicals" as used in the present specification is intended to encompass any monovalent aliphatic hydrocarbon radical such as aliphatic, cycloaliphatic, cycloaliphaticaliphatic and aliphaticcycloaliphatic hydrocarbon radicals of up to about thirty carbon atoms. Usually, these hydrocarbon radicals will not contain more than about ten carbon atoms. The hydrocarbon radicals may be saturated or unsaturated radicals. Preferably, however, they will be free from acetylenic unsaturation. Usually, the radicals will be free from ethylenic unsaturation. The hydrocarbon radicals preferably will be branched- or straight-chain alkyl radicals, particularly lower alkyl radicals, that is alkyl radicals having up to ten carbon atoms, alkyl of up to four carbon atoms being especially preferred.

The hydrocarbon radicals are illustrated by:

(1) Alkyl of up to about thirty carbon atoms such as methyl, ethyl, propyl, isopropyl, butyl, tertiary butyl, isobutyl heptyl, octyl, isooctyl, nonyl, decyl, tridecyl, octadecyl, tricosyl, octacosyl, dotriacontyl, and the like.

(2) Alkenyl of up to about thirty carbon atoms such as vinyl, allyl, 2-methallyl, 1-butenyl, 2-pentenyl, 3,4-dimethyl-2-hexenyl, 1-octenyl, 1-decenyl, and the like.

(3) Cycloalkyl of up to about thirty carbon atoms such as cyclopentyl, cyclobutyl, cyclohexyl, cycloheptyl, cyclooctyl, alkylcycloalkyl such as 2,3-dibutylcyclohexyl, cycloalkylcycloalkyl such as 3-cyclohexylcyclohexyl, and the like. Preferably, the number of carbons in the nucleus of the cycloalkyl groups is five or six, any additional carbon in these groups being due to the presence of hydrocarbon substituents attached thereto.

(4) Cycloalkenyl of up to about thirty carbon atoms such as the cyclopentenyl, cyclohexenyl, and other cycloalkanes corresponding essentially to the above cycloalkyl radicals but containing at least one ethylenic linkage in the nucleus thereof.

The foregoing are merely illustrative of monovalent hydrocarbon radicals. Thus, other representative hydrocarbon radicals include cycloalkylalkyl such as cyclohexylmethyl, butadienyl-1,3, 1 - butyl-2-butenyl, cyclohexadienyl-2,4, and the like.

The terminology "substituted hydrocarbon radical" is intended to describe those monovalent radicals corresponding essentially to the hydrocarbon radicals enumerated above but which contain atoms other than carbon and hydrogen atoms. These other atoms generally will be oxygen, sulfur, nitrogen, or halo atoms. Thus, the substituted hydrocarbon radicals contemplated by this invention are those which are characterized by interrupting groups such as

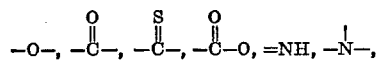

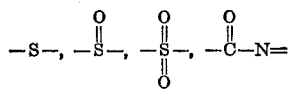

and the like. The substituted hydrocarbon radicals of this invention also include those hydrocarbon radicals containing nitro, amino, mercapto, hydroxy, carbamyl, esterified carboxyl groups, halo, and the like.

Specific illustrative examples of substituents which may be present on the substituted hydrocarbon radicals are Cl, Br, I, F, —NO₂, —NH₂,

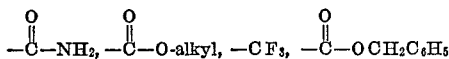

(the symbol "C₆H₅" herein is intended to designate the phenyl radical), —O-alkyl, —S-alkyl, —O-alkenyl, —S-alkenyl, —O-phenyl, —O-benzyl,

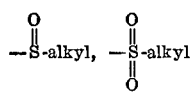

—S-phenethyl, alkyl-NH—, alkenyl-NH—, (alkyl)₂N—, (alkenyl)₂N—, C₆H₅—NH—,

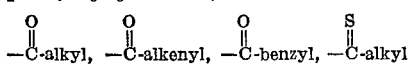

and the like. The alkyl and alkenyl groups in such substituents as —O-alkyl, —S-alkenyl, (alkyl)₂N—, and the like may contain up to ten carbon atoms. The total number of carbon atoms per substituted hydrocarbon radical should not exceed thirty and preferably will not exceed ten. Specific substituted aliphatic hydrocarbon radicals are exemplified by β-chloroethyl, 3-(diethylamino)propyl, 3-carbamylbutyl, acetonyl, 3-acetoxybutyl, 3-hydroxyhexyl, 4-acetoxybutyl, β-butyloxypropyl, 2-ethoxy-4-bromocyclohexyl, ethylsulfonylpentyl, acetoacetyloxyethyl, 6-carboethoxyhexyl, 3 - butoxypropyl, 4 - propylmercaptobutyl, 4-butylaminobutyl, hydroxymethyl, β-hydroxyethyl, β-hydroxypropyl, 4-hydroxybutyl, 2,3 - diiodopentyl, allylaminoethyl, 2-methylaminopropyl, 3-trifluoromethylcyclohexyl, and the like.

As mentioned above, the R variables preferably will be aliphatic hydrocarbon radicals. When they are substituted aliphatic hydrocarbon radicals, the substituents preferably will be selected from the group consisting of halo, nitro, hydroxy, mercapto, and alkoxy or alkylmercapto where the alkyl groups contain up to four carbon atoms.

Preferably, the N-substituted acrylamide monomers used to prepare the macromolecular compositions of this invention will be those wherein R₁–R₆ are each independently selected from the group consisting of hydrogen and lower alkyl. Due to their ease of preparation, and commercial availability, those monomers wherein R₆ is hydrogen are particularly preferred. That monomer known as diacetone acrylamide, that is, the monomer wherein R₁, R₄, and R₅ are each methyl and all the remaining R variables are hydrogen, is a particularly preferred monomer for use in the preparation of the macromolecular compositions of this invention. In addition to diacetone acrylamide per se, other specific N-substituted acrylamide monomers useful for preparing the macromolecular compositions of this invention include N-(1,1-dimethyl-3-hydroxybutyl)acrylamide,
N-(1,1-dimethyl-3-hydroxybutyl)methacrylamide,
N-(1,1-diethyl-2-methyl-3-hydroxypentyl)acrylamide,
N-[1-(2-hydroxycyclohexyl)-1-cyclohexyl]acrylamide,
N-(1-methyl-3-oxopropyl)methacrylamide,
N-(1,1-dimethyl-3-oxobutyl)-2-chloroacrylamide.

Those monomers wherein R₆ are halogen can be prepared from α-haloacrylonitriles in accordance with procedures described in commonly assigned copending application Ser. No. 97,055 filed Dec. 10, 1970, which is incorporated herein by reference. For example, 850 parts of concentrated sulfuric acid (96–98%) is placed in a reaction flask fitted with a stirrer, reflux condenser, dropping funnel, and thermometer. The sulfuric acid is then cooled to 10° C. and 350 parts of α-chloroacrylonitrile is added to the sulfuric acid slowly over a 0.5 hour period while maintaining the temperature in the range of 10°–20° C. Subsequently, 464 parts of diacetone alcohol is added drop-wise over a 1.75 hour period while maintaining the temperature a 10°–20° C. Thereafter the reaction mixture is poured into 1000 parts of crushed ice and 610 parts of a 28% aqueous solution of ammonia is added thereto while keeping the reaction mass within the temperature range of about 10°–25° C. To the resulting reaction mass, there is added 315 parts of toluene. After mixing, the organic layer is separated and washed twice with aqueous saturated sodium chloride, dried over magnesium sulfate, filtered, and stripped to 90° C. at a pressure of 15 mm. (Hg). The distillate fraction boiling in the range of 73°–80° C. at 0.25 mm. (Hg), is the desired product. By substituting other α-haloacrylonitriles and/or other β-hydroxy ketones or aldehydes for the diacetone alcohol in the foregoing process, other N-substituted acrylamides of the type contemplated by this invention are prepared wherein R₆ is halo.

Any of the various types of synthetic polymers can be used as the synthetic base polymers onto which the N-substituted acrylamides are grafted to prepare the macromolecular compositions of this invention. The terminology "synthetic base polymer" as used in describing the base polymers to be subjected to grafting is intended to encompass those polymers which are synthesized by polymerizing one or more kinds of polymerizable monomers utilizing conventional polymerization techniques. Therefore, natural polymers such as natural rubber, cellulose, wool, starch, silk, and the like are excluded as synthetic base polymers.

As noted from the foregoing description of N-substituted acrylamides, each acrylamide monomer has a polymerizable vinyl group and either a reactive carbonyl group or reactive hydroxyl group. Accordingly, the N-substituted acrylamides of this invention can readily be grafted onto synthetic base polymers having groups reactive with the aldehydo or keto carbonyl groups. For example, if the synthetic base polymer contains —$NH_2$ groups, the N-substituted acrylamides containing the reactive carbonyl groups will form a Schiff's base with the amine groups. Likewise, if the synthetic polymer has carboxylic acid anhydride groups or unreacted carboxyl groups along the chain, the N-substituted acrylamides having an alcoholic hydroxyl group can be reacted with the base polymer under conventional esterification conditions so that an ester linkage is formed between the carboxylic acid functions of the base polymer and the hydroxyl group of the N-substituted acrylamides. As will be apparent to those skilled in the art, reactive carboxyl functions can be produced on base polymers having pendant esterified carboxy groups by hydrolysis of all or a portion of the pendant ester groups to produce the free acids which can then be re-esterified with alcoholic hydroxy groups of the N-substituted acrylamides. Similarly, base polymers having epoxy functions can react with the N-substituted acrylamides containing alcoholic hydroxy groups. As the N-substituted acrylamides all possess a polymerizable ethylenic group, they may be grafted onto synthetic base polymers utilizing the conventional techniques for grafting such monomers onto synthetic polymer backbones, e.g., initiation of the addition polymerization of the ethylenic groups by free radical or ionic means. Thus, the specific nature of the synthetic base polymers is not critical as long as they do not possess groups which would inhibit polymerization. If the synthetic base polymer has no or only a few reactive groups (e.g., halo or active hydrogen such as >C—Cl, —SH, —OH, —CH=C< and the like), then grafting procedures involving free radical transfer to polymer mechanisms generally produce low yields of grafts. Thus, polyethylene and polypropylene normally will result in lower yields of graft polymer than will polybutadiene or chlorinated polypropylene under the same general conditions. Nevertheless, since even small amounts of grafted copolymer can beneficially alter the properties of the synthetic base polymer, even polyethylene is a suitable synthetic base polymer. Generally, if only 2% to 5% of the synthetic base polymer molecules contain grafts derived from the N-substituted acrylamides, this is sufficient to impart to the synthetic base polymer the desired beneficial properties associated with grafting as discussed herein.

As stated above, any synthetic polymer is an acceptable synthetic base polymer for use in preparing the macromolecular compositions of this invention. Normally, however, the synthetic base polymers will be those polymers prepared by polymerizing one or more of the following classes of monomers using conventional polymerization techniques. Polymers of this type are well-known, many being commercially available in large quantities, and, thus, no detailed description thereof is required herein. The sythetic base polymers derived from these monomers includes not only the homopolymers, but interpolymers such as the copolymers and terpolymers of these monomers with other monomers from the same or different classes as well as block and graft copolymers derived from these classes of monomers. The classes of monomers are: (1) esters of unsaturated alcohols, (2) esters of unsaturated acids, (3) esters of unsaturated polyhydric alcohols (e.g., butenediols), (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. These classes of polymerizable, ethylenically unsaturated classes of monomers are illustrated by the following specific monomers:

(1) Esters of unsaturated alcohols such as allyl, methallyl, crotyl, 1-chloroallyl, 2-chloroallyl, cinnamyl, vinyl, methylvinyl, 1-phenallyl, and butenyl alcohols with (a) saturated acids such as acetic, propionic, butyric, valeric, caproic and stearic acids, (b) unsaturated acids such as acrylic and alpha-substituted acrylic acids (including alkylacrylic acids, e.g., methacrylic, ethylacrylic, propylacrylic acids, etc., and arylacrylic acid such as phenylacrylic acid), crotonic, oleic, linoleic and linolenic acids; (c) polybasic acids such as oxalic, malonic, succinic, glutaric, adipic, pimelic, suberic, azelaic and sebacic acids; (d) unsaturated polybasic acids such as maleic, fumaric, citraconic, mesaconic, itaconic, methylenemalonic, acetylenedicarboxylic and aconitic acids; or (e) aromatic acids, e.g., benzoic, phenylacetic, phthalic, terephthalic and benzoylphthalic acids.

(2) Esters of saturated alcohols, such as esters of methyl, ethyl, propyl, isopropyl, butyl, isobutyl, sec-butyl, tert-butyl, 2-ethylhexyl, cyclohexyl, or behenyl alcohols, with unsaturated aliphatic monobasic and polybasic acids, examples of which are illustrated in (1) above.

(3) Esters of unsaturated polyhydric alcohols, e.g., butenediol, with saturated and unsaturated aliphatic and aromatic, monobasic and polybasic acids, illustrative examples of which appear in (1) above.

(4) Vinyl cyclic compounds including (a) monovinyl aromatic hydrocarbons, e.g., allylbenzene, styrene, o-, m-, p-chlorostyrenes, -bromostyrenes, -fluorostyrenes, -methylstyrenes, -ethylstyrenes, and -cyanostyrenes; di-, tri-, and tetra-, etc., -chlorostyrenes, -bromostyrenes, -iodostyrenes, -fluorostyrenes, -methylstyrenes, -ethylstyrenes, and -cyanostyrenes; vinylnaphthalenes, vinylcyclohexanes; (b) corresponding polyvinyl compounds such as divinylbenzene and trivinylbenzene; and (c) vinyl heterocycles such as vinylfuran, vinylpyridine, vinylbenzofuran, N-vinylcarbazole, N-vinylpyrrolidone, and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether, and allyl ethyl ether.

(6) Unsaturated ketones such as methyl vinyl ketone and ethyl vinyl ketone.

(7) Unsaturated amides, such as acrylamide, methacrylamide, N-methylacrylamide, N-phenylacrylamide, N-allylacrylamide, N-methylolacrylamide, and N-allylcaprolactam.

(8) Unsaturated aliphatic hydrocarbons, for instance, ethylene, propylene, butenes, butadiene, piperylene, isoprene, methylisoprene, 2-chloro-1,3-butadiene, and other alpha-olefins and conjugated dienes of up to twenty carbon atoms.

(9) Vinyl halides, e.g., vinyl fluoride, vinyl chloride, vinyl bromide, vinylidene chloride, vinylidene bromide, allyl chloride, and allyl bromide.

(10) Unsaturated mono- and polybasic acids such as exemplified in (1) above.

(11) Unsaturated acid anhydrides, e.g., maleic, citraconic, itaconic, cis-4-cyclohexene-1,2-dicarboxylic, and bicyclo(2,2,1)-5-heptene-2,3-dicarboxylic anhydrides.

(12) Unsaturated acid halides such as cinnamoyl, acrylyl, methacrylyl, crotonyl, oleyl, and fumaryl chlorides or bromides.

(13) Unsaturated nitriles, e.g., acrylonitrile, methacrylonitrile and other substituted acrylonitriles.

It is to be understood that interpolymers of one or more of the foregoing classes of monomers with one or more of the N-substituted acrylamides represented by Formula I can also be used as synthetic base polymers and are contemplated as being within the scope of the present invention. Likewise, the macromolecular compositions of this invention include graft polymers wherein the synthetic base polymer is a homopolymer of one of the N-substituted acrylamides of Formula I and the grafted moiety is derived from a different N-substituted acrylamide. Similarly, the synthetic base polymer may be an interpolymer of two or more of these N-substituted acrylamides and the grafted moiety can be derived from (a) one or more different N-substituted acrylamides or (b) a combination of a different N-substituted acrylamide with one or more of the N-substituted acrylamides used in the preparation of the synthetic base polymer. And as mentioned above, one or more other comonomers of the type represented by the above described classes can be used with one or more of the N-substituted acrylamides to form the graft moiety. Polymers and interpolymers of the N-substituted acrylamides and monomers falling within the above classes are described in the above-incorporated patents and copending applications which have been expressly incorporated herein by reference.

Other suitable synthetic base polymers are such condensation polymers as the polyamides (nylon 6, nylon 6/6, nylon 6/10, nylon 11, nylon 12), and other polyamides derived from aminocarboxylic acids or diamines and dibasic carboxylic acids including unsaturated dicarboxylic acids, polyesters derived from polyhydric alcohols and polycarboxylic acids (e.g., ethylene glycol, glycerol, dipropylene glycol, etc., with maleic anhydride, adipic acid, fumaric acid, succinic acid, or phthalic acid) the furane resins (i.e., the condensation products of furfuraldehydes with phenols and alcohols including furfuryl alcohol and the condensation products of furfuryl alcohol with itself), phenolic resins (i.e., the condensation products of phenols and aldehydes, especially formaldehyde) phenoxy resins such as the condensation product of bisphenol A with epichlorohydrin, polycarbonate, such as the polycarbonic acid ester of bisphenol A, epoxy resins including the novolac resins such as epoxy cresol novolac and epoxy phenol novolac, and the like. Still other suitable synthetic base polymers are the polyurethanes, poly(phenylene oxides), and chlorinated polyether, i.e., poly-(O—CH$_2$C(CH$_2$Cl)$_2$CH$_2$)

Other examples of suitable synthetic base polymers include butadiene-acrylic acid elastomers, butadiene-acrylonitrile-acrylic acid terpolymers, butadiene-acrylonitrile divinyl benzene terpolymer, butadiene-propylene-ethylene terpolymer, poly(dimethallylmaliate), butadiene-styrene rubber, butadiene rubber, polyisoprene, isobutylene-isoprene copolymers, ethylene-propylene rubbers, terpolymers of ethylene, propylene and other monomers, butadiene-acrylonitrile-styrene terpolymers, butadiene-styrene-vinyl pyridine terpolymers, polychloroprene rubber, chloroprene-acrylonitrile copolymers, butadiene-acrylonitrile copolymers, vinyl and phenyl-substituted poly(dimethylsiloxanes), vinyl substituted poly(dimethylsiloxanes), butadiene-styrene copolymers, polyethylene, polyvinyl chloride, ethylene-isobutyl acrylate resins, chlorinated polypropylene, polyacrylamide, styrene-divinyl benzene copolymers, polyvinyloxazoline, polyvinyl(pyrrolidone resins, polystyrene-maleic anhydride copolymers, polyvinylidene chloride, vinyl pyrrolidine-styrene copolymers, urea-formaldehyde resins, methylvinyl ether-maleic anhydride copolymers, poly(methyl vinyl ether), poly(methylmethacrylate), polystyrene, polyvinylbenzoates, styrene-maleic anhydride copolymers, tert-butyl styrene-1-olefin or 1,3-conjugated diolefin copolymers, and the like.

The synthetic base polymers can have average molecular weights falling within the range of about 500 to about 2,000,000. However, this is the extreme average molecular weight range and the molecular weights ordinarily will be within the range of about 1,000 to about 1,000,000. Desirably, the average molecular weight of the synthetic base polymers will be in the range of about 5,000 to about 750,000. Accordingly, the synthetic base polymers include both low molecular weight and high molecular weight polymers which may be either solids or liquids.

Synthetic base polymers of the type described hereinbefore or the intermediates necessary for their preparation by conventional polymerization techniques are well-known to those skilled in the art. Many are listed with commercial sources from which they may be obtained in the various editions of "Chemical Materials Catalog" published annually by Reinhold Publishing Corporation and other well-known chemical supply publications.

Synthetic base polymers characterized by the presence of at least one internal unsaturated carbon-to-carbon covalent linkage of the formula —CH=C< are particularly receptive to being grafted by N-substituted acrylamides. As used herein, the term "internal" describes those —CH=C< groups which are other than at a terminal (i.e., alpha, beta) position of the polymer chain. Obviously, synthetic base polymers having such ethylenic unsaturation at a terminal position are not excluded so long as they also have at least one internal —CH=C< linkage. The linkages may be present in the backbone of the synthetic base polymer or in groups pendant therefrom or both. Polymers and copolymers of conjugated dienes are examples of synthetic base polymers having

—CH=C< linkages in the backbone. The polymers and copolymers of divinyl maleate, vinyl acrylate, and the like are examples of synthetic base polymers characterized by pendant —CH=C< groups. Copolymers of conjugated dienes and these unsaturated carboxylic acid vinyl esters are examples of synthetic base polymers having —CH=C< groups in the backbone and also on radicals pendant from the backbone.

Similarly, the presence of one or more internal chloro groups in the synthetic base polymer rendes the base polymer readily subject to grafting by the N-substituted acrylamides represented by Formula I. The term "internal" as used here has the same meaning as to the locus of the chloro groups as it did with respect to the locus of the —CH=C< groups in the preceding paragraph. Thus, synthetic base polymers characterized by the presence of Cl—C< groups along the synthetic base polymer backbone or in groups pendant from the backbone or both constitute another class of preferred synthetic base polymers. Furthermore, this fact provides ready means for preparing a wide range of synthetic base polymers particularly suitable for grafting. That is, the synthetic base polymer can be derived from chloro-containing monomers or non-chloro containing synthetic base polymers can be chlorinated. Examples of such chloro-containing synthetic base polymers include chlorinated polypropylene, chlorinated polyisobutylene, chlorinated ethylene-propylene block copolymers, polyvinyl chloride, polychloroprene, polyvinylidene chloride resins, ethyl vinyl ether-vinyl chloride copolymer, propylene-vinyl chloride copolymer, vinyl acetate-vinyl chloride copolymers and the like.

In general, the macromolecular compositions of this invention can be prepared according to any of the conventional graft polymerization techniques. These grafting techniques are discussed in detail in the prior art. Particularly useful summaries of these techniques are found in Block and Graft Polymers by William J. Burlant and Alan S. Hoffman (published by Reinhold Publishing Corporation, 1960) and Block and Graft Copolymers by R. J. Ceresa (published by Butterworth and Co. Ltd., 1962). To avoid extensive reiteration of what is well-known in the art as shown by these publications, both are expressly incorporated herein by reference for their extensive discussions of the state of the art as the various techniques for grafting ethylenically unsaturated monomers onto various polymers. Those methods described for grafting vinyl monomers onto synthetic base polymers described in these texts are applicable to the synthesis of the macromolecular compositions of this invention from the N-substituted acrylamides. The methods described for grafting other acrylic monomers (e.g., acrylonitrile, methyl methacrylate) are especially useful.

Normally, the macromolecular compositions of this invention will be prepared by the addition polymerization of the N-substituted acrylamides by free radical methods in the presence of the synthetic base polymer or polymers onto which the N-substituted acrylamides are to be grafted. Grafting by this method involves a "transfer" of a free radical site to the synthetic base polymer. Propagation with the N-substituted acrylamides from these "transferred" free radical sites produces the grafted side chains which are ultimately terminated by combination or disproportionation. As is well-known, the "transfer" actually involves the creation of a new free radical site on the synthetic base polymer as a result of the abstraction of a chain-terminating group (e.g., an active hydrogen atom, a chloroatom, etc.) from the synthetic base polymer.

Polymerization by the free-radical method may be effected in bulk, solution, suspension or emulsion, by contacting the monomer or monomers with a polymerization initiator in the presence of the synthetic base polymer and either in the absence or presence of a diluent at a temperature within the range of about 0° C. to about 200° C., usually about 20° C. to about 125° C. Any conventional free radical initiators can be employed in preparing the graft polymers including x-ray and gamma irradiation. Suitable initiators include the organic peroxides such as benzoyl peroxide, cumyl hydroperoxide, tertiary butyl hydroperoxide, acetyl peroxide, and the like; hydrogen peroxide, hydrogen peroxide-ferrous ion combinations, azobisisobutyronitrile, sodium persulfate, ammonium persulfate, chlorate-sulfite, and the like. Benzoyl peroxide is a particularly preferred initiator.

Solution polymerization may be effected in any substantially inert organic liquid diluent which is a solvent for the synthetic base polymer such as benzene, chlorobenzene, toluene, xylene, cyclohexane, n-hexane, naphtha, tetrahydrofuran, mineral oil, and the like. As a general rule, solution polymerization requires a high concentration of the N-substituted acrylamide monomers relative to the solvent to achieve the desired degree of grafting when compared with, for example, emulsion or bulk polymerization.

Emulsion and suspension polymerization are generally conducted in water or a mixture of water and a hydroxylated organic solvent. The latter are exemplified by alcohols and glycols, such as the lower alkanols (e.g., alkanols of up to seven carbon atoms), alkylene glycols, polyalkylene glycols, mono lower alkyl ethers of such glycols (e.g., ethylene glycol, propylene glycol, tetramethylene glycols, diethylene glycol, ethylene glycol monobutyl ether, diethylene glycol monoethyl ether), and the like. Suitable emulsifiers for use in the preparation of emulsion polymers of this invention include catonic materials such as stearyl dimethyl benzyl ammonium chloride; non-ionic materials such as alkylaryl polyether alcohols and sorbitan mono-oleate; anionic materials such as sodium decylbenzene sulfonate, dioctyl sodium sulfosuccinate, sodium salts of alkylaryl polyether sulfates, and sodium lauryl sulfate; alkali metal salts of lignosulfonic acids, silicic acids, and the like; and colloidal materials such as casein, sodium polyacrylate, carboxymethylcellulose, hydroxyethylcellulose, gum tragacanth, sodium alginate, gelatin, methylcellulose, gum arabic, dextrins, or polyvinyl alcohol.

As is usual in the case of graft polymers, particularly in commercially utilized graft polymers, it is unnecessary to separate the graft polymer from any ungrafted synthetic base polymer or any polymers and copolymers of the N-substituted acrylamides formed during the grafting process. In fact, the isolation of pure graft polymers is generally a matter of academic interest since their isolation is a tedious, time-consuming, and, thus, expensive procedure. Accordingly, the macromolecular compositions of this invention normally will be employed as they are produced, that is, as a heterogeneous admixture of the desired graft polymer, and any ungrafted synthetic base polymer or homopolymerized or copolymerized polymer produced from the polymerization of the N-substituted acrylamides which is present in the graft polymerization reaction mixture. The presence of these other materials does not interfere with the use of the graft polymers, i.e., the macromolecular compositions of this invention.

Where it is desired to isolate the graft polymer, the principal techniques employed are fractional precipitation from a common solvent, fractional elution with successive mixtures of solvent and nonsolvent, selective precipitation from a solution of the products produced by the graft polymerization techniques, and selective elution, and combinations of these methods. The methods for the isolation of graft polymers are known to those skilled in the art. See, for example, Block and Graft Copolymers at pages 136 through 146.

The following illustrative examples further exemplify and describe the macromolecular compositions of this invention.

EXAMPLE 1

(a) A reaction vessel fitted with a stirrer, thermocouple, reflux condenser, and a gas inlet and containing 90 parts of a nonemulsifiable waxy polyethylene (commercially available as Epolene N from Eastman Chemical Products, Inc.) 10 parts diacetone acrylamide, and 180 parts benzene is heated to about 80° C. over a one-hour period while passing nitrogen gas through the mixture. At about 75° C., the polyethylene is dissolved. Then, 0.05 part of benzoyl peroxide is added and the resulting reaction mixture is heated at about 80° C. for six hours. The reaction mixture is then cooled to room temperature, poured into 960 parts of acetone, and filtered. The filter cake is then dried to a constant weight resulting in the recovery of 94 parts of a white powder which contains the desired polyethylene graft polymer.

(b) Following the same general procedure of (a) above, 75 parts of the polyethylene, 25 parts of diacetone acrylamide, and 0.15 part of benzoyl peroxide are employed to produce 81.5 parts of a white solid containing the desired polyethylene graft polymer.

(c) Again following the same general procedure of (a), 50 parts of the polyethylene, 50 parts of diacetone acrylamide, and 0.25 part of benzoyl peroxide are employed to produce 92.2 parts of a white solid containing the desired polyethylene graft polymer.

(d) Following the general procedure of (a) 50 parts of the polyethylene, 50 parts of N - (1,1 - dimethyl - 3-hydroxybutyl)-acrylamide, and 0.25 part of benzoyl peroxide are employed to produce 83 parts of solid product containing the desired polyethylene graft polymer.

EXAMPLE 2

(a) A mixture comprising 20 parts of polypropylene (commercially available as Union Carbide Corporation's Polypropylene JMD–8501) and 6 parts of diacetone acrylamide are milled together through a 20 mesh screen. Then the milled mixture is mixed with a benzene solution containing about 0.32 part of benzoyl peroxide and the benzene evaporated under vacuum. The dried material is then powdered and the powder heated at about 102° C. for about five hours in a nitrogen atmosphere producing a white, solid, polymerization reaction mixture containing the desired grafted polypropylene polymer.

(b) The reaction mixture is then milled through a 20 mesh screen to produce a white powder which is dried by heating in an oven under vacuum. Then, 5.5 parts of the dried powder and 200 parts of methyl ethyl ketone are placed in a vessel equipped with a stirrer and reflux condenser and the powder is extracted with refluxing ketone for two days. The resulting mixture is then filtered. The filtrate is then mixed with heptane to precipitate the extracted solids. The infrared spectrum of the precipitated, extracted solids shows the presence of poly(diacetone acrylamide). The infrared spectrum of the remaining solid material which did not dissolve in the methyl ethyl ketone is characterized by peaks corresponding to those of polypropylene and poly(diacetone acrylamide).

This establishes that the polypropylene contained grafted moieties of poly(diacetone acrylamide) since any poly(diacetone acrylamide) homopolymer would have been extracted by the methyl ethyl ketone.

EXAMPLE 3

(a) An N-substituted acrylamide graft of a butadiene-styrene copolymer is prepared by first mixing 160 parts of benzene, 30 parts of diacetone acrylamide, 10 parts of the butadiene-styrene copolymer (Buton 100 available from Enjay Chemical Company), and 0.2 part of benzoyl peroxide and then heating the mixture at about 65° C. for sixteen hours.

(b) The general procedure of (a) is repeated using 10 parts of another butadiene-styrene copolymer (Buton 150, also available from Enjay Chemical Company).

EXAMPLE 4

(a) To a reaction vessel equipped with stirrer, gas inlet tube, and reflux condenser there is added a mixture of 380 parts of diacetone acrylamide, 200 parts of a 10% solution of SBR rubber in xylene (the SBR rubber is the commercially available Phillips 66 1503 type), and 1420 parts of xylene. The reaction vessel containing the mixture is then purged with nitrogen for one hour after which 2 parts of lauryl peroxide is added and the mixture is heated to about 65° C. The reaction mixture is then maintained at about 65°–75° C. for about four hours. The reaction product is a clear gel containing the desired SBR graft polymer.

(b) The general procedure of (a) is repeated using 300 parts of diacetone acrylamide, 1000 parts of the SBR rubber solution, 700 parts xylene, and 2 parts lauryl peroxide. Again the product is a clear gel.

EXAMPLE 5

(a) To a mixture comprising 15 parts polystyrene, 4 parts diacetone acrylamide, and 50 parts benzene there is added 0.44 part of benzoyl peroxide. After mixing, the benzene is evaporated from the mixture under vacuum at room temperature. Then the dried mixture is placed in an oven and heated at about 150° C. for 1.75 hours. The resulting reaction mixture is a mixture of the desired polystyrene graft and poly(diacetone acrylamide). After isolating the graft polymer, it is found that about 17% of the diacetone acrylamide being in the form of grafts on the polystyrene.

(b) A reaction vessel, fitted with a stirrer, reflux condenser, gas inlet line, and thermometer, and containing 20 parts polystyrene, 20 parts diacetone acrylamide, and 60 parts xylene is purged with nitrogen for one hour. Then 0.2 part of benzoyl peroxide is added and the reaction mixture is heated at the xylene reflux temperature for three hours. The reaction product contains the desired styrene graft polymer.

Enough benzene is added to the reaction product to dissolve the product. This solution is filtered into a separatory funnel, and then precipitated by the addition of methanol. The precipitated product is filtered and dried in a vacuum oven at 30° C. for four hours. Then, 5.5 parts of the precipitated polymer is dissolved in 155 parts of benzene. After adding 60 parts methanol to the solution, it is allowed to stand for sixteen hours. Two layers form. To the isolated upper layer is added 40 parts methanol. No precipitate forms. After evaporating the benzene and alcohol, there is recovered 3.4 parts of polystyrene graft polymer characterized by a nitrogen content of 2.1%.

EXAMPLE 6

Diacetone acrylamide is grafted onto an acrylonitrile-butadiene interpolymer (Hycar 1312 available from B. F. Goodrich Co.) by heating a mixture of 160 parts benzene, 30 parts diacetone acrylamide, 10 parts of the Hycar 1312, an 0.2 part benzoyl peroxide for sixteen hours at 65° C.

EXAMPLE 7

(a) A commercially available alkyd polymer (Duraplex ND–78 obtained from Rohm & Haas Co.) is grafted with poly(diacetone acrylamide) units in the following manner: sixty parts of a 60% solution of the alkyl polymer in xylene, 9 parts diacetone acrylamide, and 50 parts benzene are mixed at 70°–75° C. bubbling nitrogen through the mixture. Then a solution of 0.05 part benzoyl peroxide in 4 parts benzene is added and the resulting reaction mixture is heated at 73°–76° C. for 1.5 hours. The same quantity of benzoyl peroxide in benzene is again added and heating is continued at 75°–78° C. for 4.5 hours. The reaction mixture is then filtered and the filtrate stripped. The stripped product is dried in a vacuum oven at 80° C. The dried material contains the desired graft polymer and is characterized by a nitrogen content of 1.73%.

(b) Following the general procedure of (a), another graft polymer of an alkyd polymer (Aroplaz 1430M50 sold by Archer-Daniels-Midland Corporation) is prepared from 58 parts of a 50% solution of the alkyl polymer in mineral spirits, 7.2 parts diacetone acrylamide, and 50 parts benzene.

EXAMPLE 8

A reaction vessel fitted with reflux condenser, thermometer, stirrer, and gas inlet line and containing a mixture of 333 parts of polybutadiene latex (polybutadiene latex FRS2004 available from Firestone Rubber Co.), 800 parts of a 1:1 weight ratio mixture of diacetone acrylamide and water, 1300 parts water, 20 parts of the sodium salt of dioctyl sulfosuccinate (anionic wetting agent), 20 parts of ethoxylated octylphenol having a weight ratio of octylphenol for ethylene oxide units of 1:40 (nonionic wetting agent) and 50 parts of a n-dodecyl mercaptan-water mixture (1 part mercaptan per 100 parts water) is purged with nitrogen for one hour at room temperature. Then one part of potassium peroxydisulfate ($K_2S_2O_8$) is added and the mixture is heated to about 45° C. While maintaining a temperature of 45°–50° C., a mixture comprising 800 parts of the above diacetone acrylamide-water mixture, 16 parts of a resin acid soap (wetting agent), and 150 parts of the above mercaptan-water mixture are added dropwise over a two-hour period. The resulting mixture is heated at about 50° C. for three hours. Then 25 parts of sodium hydroxide solution is added and heating at 50°–60° C. is continued until a coagulated latex is formed. This coagulated latex contains the desired polybutadiene graft polymers.

EXAMPLE 9

A graft polymer of poly(methylmethacrylate) having an average molecular weight of about 550,000 is prepared by thoroughly admixing 40 parts of the milled polymer, 12 parts of an equal molar admixture of diacetone acrylamide and N-(1,1-dimethyl-3-hydroxybutyl) methacrylamide, and 0.06 part of benzoyl peroxide and thereafter heating this mixture for six hours at 100° C.

EXAMPLE 10

A mixture comprising 10 parts of polystyrene having an average molecular weight of about 175,000, 30 parts of N - (1,1 - dimethyl - 3 - hydroxybutyl)acrylamide, 2 parts of methylmethacrylate, and 0.15 part of benzoyl peroxide is heated at a temperature of 120° C. for five hours to produce the desired graft polymers. The grafted moiety of these polymers are characterized by the presence of repeating linkages derived from the N-substituted acrylamide as well as those derived from the methylmethacrylate.

EXAMPLE 11

Graft polymers of polyvinyl chloride are prepared in the following manner. First, poly(vinyl chloride) is prepared by polymerizing 300 parts of vinyl chloride monomer at 60° C. in the presence of 650 parts water and one part potassium persulfate and one part sodium lauryl sulfate. Fifty parts of diacetone acrylamide is added to the thus-produced poly(vinyl chloride) latex with 0.25 part of potassium persulfate. This mixture is then polymerized for twenty hours at 75° C. The resulting reaction mixture is then coagulated by adding a 10% calcium chloride solution, washed, and dried at 70° C.

EXAMPLE 12

A styrene-maleic anhydride interpolymer is obtained by preparing a solution of 16.3 parts styrene and 12.9 parts maleic anhydride in 270 parts of a benzene-toluene solution, wherein the weight ratio of benzene:toluene is 66.5:33.5, and then contacting the solution at 86° C. in nitrogen atmosphere for eight hours with a catalyst solution prepared by dissolving 0.42 part of 70% benzoyl peroxide in 2.7 parts of a similar benzene-toluene mixture. The resulting product is a thick slurry of the interpolymer in the solvent mixture. To the slurry there is added 141 parts mineral oil while the solvent mixture is being distilled off at 150° C. and then at 150° C./200 mm. Hg. To 209 parts of the stripped mineral oil-interpolymer slurry there are added 25.2 parts toluene and 68 parts of hydroxymethylated diacetone acrylamide prepared according to the procedure of Example 8 in copending application Ser. No. 833,162. To the resulting mixture there is added 96% sulfuric acid (2.3 parts). The mixture is then heated at 150°–160° C. for twenty hours while water is distilled off. When water evolution ceases, no more water is evolved. The reaction mixture is heated to 150°–160° C./10 mm. Hg to distill off toluene and any other volatile components. The stripped product is mixed with an additional amount of mineral oil (12 parts) and filtered. The filtrate is a mineral oil solution of the synthetic base polymer containing the N-substituted acrylamide in the form of pendant ester groups resulting from a reaction between the maleic anhydride units and the hydroxymethyl groups of the acrylamide.

Esterification reactions between other synthetic base polymers containing pendant reactive carboxyl groups and other N-substituted acrylamides containing alcohol hydroxyl groups can be accomplished simply by heating the synthetic base polymer and the N-substituted acrylamide under condtions typical for effecting esterification. Such conditions usually involve a reaction temperature of at least about 80° C., usually from about 100° C. to about 350° C., provided that the temperature is below the decomposition point of the reaction mixture, and the removal of water of esterification as the reaction proceeds. Such conditions may optionally include the use of an excess of the N-substituted acrylamide so as to facilitate esterification, the use of solvents or diluents such as mineral oil, toluene, benzene, xylene or the like, and an esterification catalyst such as toluene sulfonic acid, sulfuric acid, aluminum chloride, boron trifluoride-triethylamine, hydrochloric acid, ammonium sulfate, phosphoric acid, sodium methoxide or the like. These conditions and variations thereof are well-known in the art.

In the foregoing illustrative examples and elsewhere in this present specification, all percentages and parts are intended to designate percent by weight and parts by weight unless otherwise indicated.

When free radical catalyst (e.g., benzoyl peroxide) are employed to initiate grafting, it is often helpful to premix the synthetic base polymer and catalyst, usually at the polymerization temperature, before adding the N-substituted acrylamide monomers and other comonomers. This usually increases the efficiency of the grafting by reducing the amount of homopolymerization and copolymerization of the added monomers.

By substituting other of the N-substituted acrylamides corresponding to Formula I for those used in the foregoing examples, other graft polymers within the scope of the present invention are readily prepared. Likewise, two or more of the N-substituted acrylamides can be employed simultaneously to produce "copolymer" grafts along the base polymer backbone. Similarly, other ethylenically unsaturated monomers selected from the thirteen different classes enumerated hereinabove can be used in combination with one or more of the N-substituted acrylamides according to the general procedures of the foregoing illustrative examples to prepare macromolecular compositions of this invention wherein the grafted moiety contains units derived from both the N-substituted acrylamides and the other selected ethylenically unsaturated monomer or monomers.

Another useful technique for preparing the macromolecular compositions of this invention involves the use of ultraviolet X-ray, or gamma irradiation to produce free radicals on the synthetic base polymer. These free radicals furnish polymerization sites from which propagation with the N-substituted acrylamides proceeds thereby furnishing the desired graft.

These irradiation techniques can be employed in several ways. Thus, the synthetic base polymer can be irradiated in the absence of oxygen and other free radical acceptors, for example, in a vacuum, to produce "trapped" radicals along the backbone of the synthetic base polymer. After the irradiation of the synthetic base polymer is completed, it is then contacted with the N-substituted acrylamides. The N-substituted acrylamides can be contacted with the irradiated synthetic base polymer in the liquid, solid, or gaseous state. Obviously, the radical acceptors other than the N-substituted acrylamide monomers to be grafted onto the synthetic base polymer should be excluded.

Another technique for achieving grafting through the use of irradiation techniques is to subject a mixture of the synthetic base polymer and the N-substituted acrylamide monomers to irradiation. The synthetic base polymer and the monomer may be in the form of an aqueous emulsion. For example, grafting may be achieved by contacting a latex with the N-substituted acrylamides for a period of several hours to several days and thereafter subjecting the latex to X-ray or gamma irradiation. When grafting is accomplished by subjecting a mixture of the N-substituted acrylamides and the synthetic base polymer to irradiation, the grafting will occur primarily at the surface of the synthetic base polymer unless substantially all of the base polymer can be brought into intimate contact with the N-substituted acrylamide monomers. Such intimate contact is accomplished, for example, where the synthetic base polymer is soluble in the monomer or can be swollen with the monomer or where thorough mechanical admixture can be achieved. On the other hand irradiating synthetic base polymer films in the presence of the N-substituted acrylamide monomers results primarily in the formation of grafts along the surface of the film. The presence of methanol in the base polymer-monomer mixture usually increases grafting efficiency with X-ray and gamma irradiation. Likewise, the presence of photosensitizers such as benzil, benzoin, anisoin, dinitrobenzil, 1-chloroanthraquinone, xanthone, benzophenone, 2-chloroanthraquinone, and the like promotes grafting efficiency with ultra-violet light.

When employing X-ray or gamma irradiation techniques, a dose rate of 20 to about 500,000 r./hr. can be employed. However, dose rates of about 0.1–6.0×10⁵ r./hr. are usually employed. The total dose required obviously depends on the nature of the synthetic base polymer and the particular N-substituted acrylamide monomer selected for the grafting. Generally however, the total dose will vary between about 5,000 to about 700,000 rad. Since grafting by irradiation techniques is old in the art, no further discussion is necessary here.

The manner in which the macromolecular compositions of this invention can be used varies extensively and depends primarily on the particular synthetic base polymer selected to prepare the macromolecular compositions. Where the synthetic base polymer moiety comprises at least 50% of the total average molecular weight of the macromolecular composition (i.e., the molecular weight of the synthetic base polymer moiety plus the weight of the grafted moiety), the macromolecular compositions can be used in the same manner and for the same purpose as the synthetic base polymer from which they are derived. This is especially true for the macromolecular compositions wherein the synthetic base polymer moiety comprises at 70% of the average molecular weight of the macromolecular positions. Accordingly, since these synthetic base polymers as well as their uses and methods of use are well-known, those skilled in the art will have no difficulty in utilizing the macromolecular compositions of this invention.

For example, acrylonitrile-butadiene-styrene copolymers having diacetone acrylamide grafted thereon can be used alone or blended with non-grafted ABS and formed into pipes, mechanical components, and the like by extrusion, injection, and vacuum forming techniques in the same manner as non-grafted ABS. Likewise, ABS copolymers having the N-substituted acrylamides grafted thereon may be mixed with polyvinyl chloride resins in amounts of about 2%–20% by weight to increase the impact strength of the PVC resin. Similarly chlorinated polyether having the N-substituted acrylamides grafted thereon can be used alone or mixed with other non-grafted chlorinated polyether, with or without fillers such as graphite, and precision molded or extruded by conventional techniques for processing chlorinated polyether to fabricate various mechanical components such as valves, rods, pipe fittings, etc., which are very corrosion resistant. Poly(4-methylpentene-1) having the N-substituted acrylamides grafted thereon have improved toughness. It can be injection molded into a variety of useful objects such as trays and extruded into tubing.

Polyethylene containing grafts of the N-substituted acrylamides can be used alone or in combination with non-grafted polyethylene to produce injection molded cargo panels and other parts. N-substituted acrylamide grafts on chlorinated polyethylene increases the rigidity of items prepared from the grafted chlorinated polyethylene. The polypropylene polymers having N-substituted acrylamide groups grafted thereon impart improved impact characteristics to articles prepared therefrom by the conventional methods for processing polypropylene.

Poly(1-olefins) and chlorinated poly(1-olefins) such as polyethylene, polypropylene, chlorinated polyisobutylene, and ethylene-propylene copolymers having average molecular weights of about 2,000 to about 20,000 and having N-substituted acrylamide grafts pendant therefrom are effective ashless dispersants for lubricating oils when the grafted moiety comprises about 5%–15% by weight of the macromolecular composition. For this use, the macromolecular compositions should be employed in the oil at a concentration of about 0.1%–5%. If the poly(1-olefin) or chlorinated poly(1-olefin) synthetic base polymer has a higher average molecular weight, for example, about 70,000 to about 120,000, the resulting macromolecular composition is an effective viscosity index improver for lubricating oils while retaining the dispersant properties when employed in the same concentration range.

Those macromolecular compositions wherein the synthetic base polymer moiety comprises less than about 50% of the macromolecular compositions of this invention can be used in essentially the same manner as the polymers and copolymers of the N-substituted acrylamides. Uses and methods of use of the polymers and copolymers of the N-substituted acrylamides are described in U.S. Pat. 3,497,467 which is incorporated herein by reference. Similarly uses and methods of use of the N-substituted acrylamide polymers and copolymers are also described in the previously incorporated patents and copending, commonly assigned applications.

As will be apparent to those skilled in the art of polymer chemistry, the "50%" dividing line discussed above is not absolutely limiting. Many of the macromolecular compositions having less than 50% of the average molecular weight attributable to the synthetic base polymer moiety will be useful for the same purpose and in the same manner as the synthetic base polymer from which it is derived. However, the "50%" dividing line is a useful guideline in describing the various applications to which the macromolecular compositions of this invention can be adapted.

As mentioned hereinbefore, the grafted moieties derived from the N-substituted acrylamides of this invention impart many desirable chemical and physical properties to the macromolecular compositions of this invention without any serious adverse effects on the properties of the synthetic base polymers. For example, the reactive groups on the N-substituted acrylamide provide cross-linking sites. Furthermore, the presence of these grafted moieties imparts improved water resistance to the synthetic base polymers as well as improved ultraviolet resistance. Thus, the macromolecular compositions of this invention resist degradation caused by water and U.V. light exposure. Likewise, strength, hardness, and gloss are imparted to the synthetic base polymers by the presence of the grafts. Likewise, the surface activity of the synthetic base polymers is improved by the presence of the grafted moieties.

Accordingly, those skilled in the art will recognize many other uses for the macromolecular compositions of this invention not specifically described herein.

What is claimed is:

1. A macromolecular composition of matter characterized by the presence within its structure of a synthetic base polymer moiety derived from a conjugated diene, said base polymer moiety having pendant therefrom at least one grafted moiety which comprises a plurality of units obtained by free radical polymerization of a polymerizable monomer of the formula

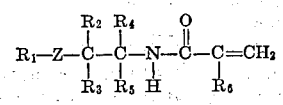

wherein $R_1$, $R_2$, $R_3$, $R_4$ and $R_5$ are each independently selected from the group consisting of hydrogen, aliphatic hydrocarbon radicals, and substituted aliphatic hydrocarbon radicals; $R_6$ is selected from the group consisting of hydrogen, halo, and lower alkyl radicals; and Z is selected from the group consisting of

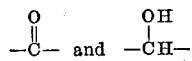

2. A macromolecular composition of matter according to claim 1 wherein said base polymer moiety has an average molecular weight of up to about 2,000,000 and comprises from about 20% to about 99.5% by weight of the macromolecular composition.

3. A macromolecular composition according to claim 1 wherein said base polymer moiety has an average molecular weight of from about 1000 to about 1,000,000 and comprises from about 70% to about 98% by weight of the macromolecular composition.

4. A macromolecular composition according to claim 3 wherein $R_1$, $R_2$, $R_3$, $R_4$, $R_5$, and $R_6$ are each independently selected from the group consisting of hydrogen, lower alkyl, and hydroxyalkyl wherein the hydroxyalkyl groups contain up to four carbon atoms.

5. A macromolecular composition of matter according to claim 4 wherein Z is

6. A macromolecular composition of matter according to claim 4 wherein Z is

7. A macromolecular composition according to claim 6 wherein $R_6$ is hydrogen.

8. A macromolecular composition according to claim 7 where said grafted moiety is derived from diactone acrylamide.

References Cited
UNITED STATES PATENTS

| | | | |
|---|---|---|---|
| 3,277,056 | 10/1966 | Coleman | 260—63 |
| 3,432,577 | 3/1969 | Serniuk | 260—879 |

JOSEPH L. SHOFTER, Primary Examiner

W. F. HAMROCK, Assistant Examiner

U.S. Cl. X.R.

260—875, 884, 885, 886